United States Patent
Matsuoka

(10) Patent No.: US 8,325,997 B2
(45) Date of Patent: Dec. 4, 2012

(54) IMAGE PROCESSING DEVICE

(75) Inventor: Takashi Matsuoka, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 854 days.

(21) Appl. No.: 12/259,308

(22) Filed: Oct. 28, 2008

(65) Prior Publication Data
US 2010/0008548 A1    Jan. 14, 2010

(30) Foreign Application Priority Data
Jul. 14, 2008 (JP) .................... 2008-182400

(51) Int. Cl.
*G06K 9/00* (2006.01)
(52) U.S. Cl. ........ 382/118; 345/419; 345/619; 348/169; 348/240.3; 382/167; 382/190
(58) Field of Classification Search .................. 382/118, 382/167, 190
See application file for complete search history.

(56) References Cited

U.S. PATENT DOCUMENTS

| | | | |
|---|---|---|---|
| 7,366,330 B2 * | 4/2008 | Ito ................................. | 382/118 |
| 7,453,506 B2 * | 11/2008 | Li ............................. | 348/333.12 |
| 7,769,233 B2 * | 8/2010 | Enomoto et al. .............. | 382/190 |
| 8,116,535 B2 * | 2/2012 | Nozawa ........................ | 382/118 |
| 8,194,097 B2 * | 6/2012 | Xiao et al. ..................... | 345/619 |
| 2008/0137957 A1 * | 6/2008 | Xu et al. ........................ | 382/190 |
| 2009/0141141 A1 * | 6/2009 | Onozawa ................... | 348/222.1 |
| 2009/0256925 A1 * | 10/2009 | Yoshizumi ................. | 348/222.1 |
| 2009/0285454 A1 * | 11/2009 | Xu ................................ | 382/118 |

FOREIGN PATENT DOCUMENTS

JP    2008-098755    4/2008

* cited by examiner

*Primary Examiner* — Gregory M Desire
(74) *Attorney, Agent, or Firm* — Peyton C. Watkins

(57) ABSTRACT

A large-size face is immediately detected from a subject image. An image processing circuit of an imaging device detects a human face from a subject image and performs AWB, AE, and AF. The image processing circuit has processing for detecting a relatively-large-size face, processing for detecting a relatively-medium-size face, and processing for detecting a relatively-small-size face. When detecting a face, the image processing circuit first repeats, a plurality of times, processing for detecting a relatively-large-size face and outputting a detection result; performs processing for detecting a relatively-medium-size face and outputting a detection result; repeats, a plurality of times, processing for detecting a relatively-large-size face and outputting a detection result; and subsequently performs processing for detecting a relatively-small-size face and outputting a detection result.

5 Claims, 4 Drawing Sheets

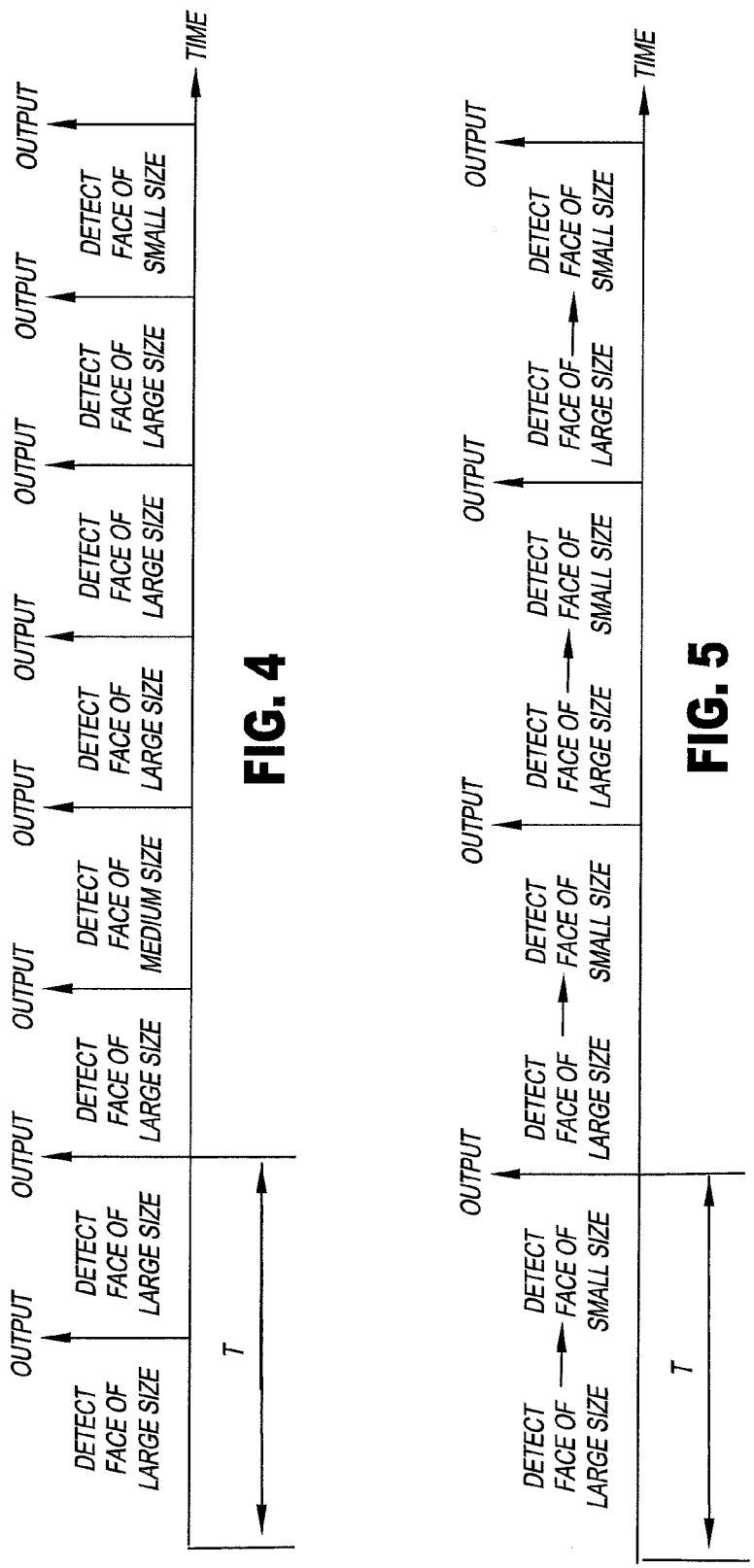

IMAGE PROCESSING DEVICE

CROSS REFERENCE TO RELATED APPLICATIONS

This application claims priority to Japanese Patent Application No. 2008-182400 filed on Jul. 14, 2008, which is incorporated herein by reference in its entirety.

FIELD OF THE INVENTION

The present invention relates to an image processing device, and more particularly to a technique for detecting a human face from a subject image captured by means of photographing.

BACKGROUND OF THE INVENTION

A technique for detecting a human face from a subject image captured with a digital camera, or the like, by means of photographing has hitherto been known. For instance, Japanese Publication No. 2008-98755 discloses a technique for detecting a face image from a subject image, superimposing a circular, square, or oval icon on the image in correspondence to the face image, and displaying the thus-superimposed image. Detecting eyes from an image at the time of detection of a face and extracting characteristic points serving as organs (parts) of a face other than the eyes are described.

When a human face is detected from a subject image, a negative correlation generally exists between the size of a face to be detected and a processing time consumed by detection. Namely, the smaller the size of a face to be detected, the longer a processing time required for detection. Further, the larger the size of a face to be detected, the shorter the processing time required for detection.

In the meantime, as a distance to a person becomes shorter, the size of a face of the person in a subject image becomes greater. When compared with a case where a distance to a face is long and where the size of the face is small, priority of detection of the face becomes higher.

For these reasons, in the case of detection of a human face, conceivable processing is to first detect a large-size face involving consumption of a longer processing time and a comparatively great necessity for detection; next detect a medium-size face and finally detect a small-size image; and output results of detection as a detection result.

However, provided that a large-size face has emerged in a subject image after a transition is made to processing for detecting a face of a medium size, or thereabouts, as a result of an attempt being first made to detect a large-size face but ending in a failure (as in a case where a digital camera pans or zooms in, and the like), the face cannot be detected by means of processing for detecting a face of a medium size, or thereabouts. Even when a transition is next made to processing for detecting a small-size face, the large-size face cannot yet been detected. Detection of the face becomes successful as a result of a transition being made to the next detection cycle and again to processing for detecting a large-size face. A detection result is first output after a transition has been made to subsequent processing for detecting a face of a medium size or thereabouts and processing for detecting a small-size face. Consequently, a lag arises between a timing at which a large-size face is detected and a timing for outputting a detection result.

A result of detection of a face can be used for controlling AE (automatic exposure control), AF (automatic focusing control), AWB (automatic white balance), and the like, as well as for displaying an icon superimposed on a subject image as in the related art. Hence, a lag in a timing for detecting a face causes a lag in control operations, such as AE, AF, and AWB. It is also effective to increase processing speed of a CPU in a face detection circuit or a face detection engine, thereby shortening a detection cycle. However, this method leads to an increase in a processing load or cost of the CPU.

SUMMARY OF THE INVENTION

Accordingly, the present invention provides an imaging device capable of quickly detecting a large-size face.

The present invention is directed toward an image processing device for detecting a human face from a subject image, the device comprising:

an imaging unit that captures a subject image; and a detection unit that detects a face from the subject image and that has at least processing for detecting a relatively-large-size face as the face and processing for detecting a relatively-small-size face as the face, wherein the detection unit first repeats, a plurality of times, processing for detecting the relatively-large-size face and outputting a detection result, and subsequently performs processing for detecting the relatively-small-size face and outputting a detection result.

In one embodiment of the present invention, the detection unit has processing for detecting a relatively-large-size face as the face, processing for detecting a relatively-medium-size face as the face, and processing for detecting a relatively-small-size face as the face; and the detection unit first repeats, a plurality of times, processing for detecting a relatively-large-size face and outputting a detection result, subsequently performs processing for detecting a relatively-medium-size face and outputting a detection result, repeats a plurality of times processing for detecting a relatively-large-size face and outputting detection results, and subsequently performs processing for detecting a relatively-small-size face and outputting a detection result. Further, the detection unit first repeats three times processing for detecting a relatively-large-size face and outputting a detection result, subsequently performs processing for detecting a relatively-medium-size face and outputting a detection result, repeats three times processing for detecting a relatively-large-size face and outputting a detection result, and performs processing for detecting a relatively-small-size face and outputting a detection result.

The present invention is also directed toward an image processing device for detecting a human face from a subject image, comprising:

an imaging unit that captures a subject image; and a detection unit that detects a face from the subject image and that has at least processing for detecting a relatively-large-size face as the face and processing for detecting a relatively-small-size face as the face, wherein the detection unit first performs processing for detecting a relatively-large-size face and outputting a detection result subsequently performs processing for detecting a relatively-small-size face and outputting a detection result, again performs processing for detecting a relatively-large-size face and outputting a detection result, and performs processing for detecting a relatively-small-size face and outputting a detection result.

In one embodiment of the present invention, the detection unit has processing for detecting a relatively-large-size face as the face, processing for detecting a relatively-medium-size face as the face, and processing for detecting a relatively-small-size face as the face, wherein the detection unit first performs processing for detecting a relatively-large-size face and outputting a detection result, repeats twice processing for detecting a relatively-medium-size face and outputting a detection result, subsequently performs processing for detecting a relatively-large-size face and outputting a detection result, and repeats twice processing for detecting a relatively-small-size face and outputting a detection result.

In another embodiment of the present invention, the detection unit detects a face while masking predetermined areas on both lateral ends of the subject image, to thus eliminate the predetermined areas from a processing target, and a face is detected without performance of masking operation in any of the plurality of processing operations for detecting a large-size face.

The present invention is further directed toward an image processing device for detecting a human face from a subject image, comprising:
an imaging unit that captures a subject image; and
a detection unit that detects a face from the subject image and that has at least processing for detecting a relatively-large-size face as the face, processing for detecting a relatively-medium-size face as the face, and processing for detecting a relatively-small-size face as the face, wherein
the detection unit first repeats three times processing for detecting a relatively-large-size face while making predetermined areas on both lateral ends of the subject image and outputting a detection result, performs processing for detecting a relatively-medium-size face while masking the predetermined areas on both lateral ends of the subject image and outputting a detection result, repeats twice processing for detecting a relatively-large-size face while making predetermined areas on both lateral ends of the subject image and outputting a detection result, performs processing for detecting a relatively-large-size face without performance of masking operation and outputting a detection result, and performs processing for detecting a relatively-small-size face while masking predetermined areas on both lateral ends of the subject image and outputting a detection result.

According to the present invention, a large-size face can be immediately detected from a subject image.

The invention will be more clearly comprehended by reference to the embodiments provided below. However, the scope of the invention is not limited to the embodiments.

BRIEF DESCRIPTION OF THE DRAWINGS

Preferred embodiments of the present invention will be described in detail by reference to the following drawings, wherein:

FIG. 4 is a descriptive view of face detection processing and a timing for outputting a result in the present embodiment;

FIG. 5 is a descriptive view of face detection processing and a result output timing in the related art;

DETAILED DESCRIPTION OF THE INVENTION

Embodiments of the present invention will be described hereunder by reference to the drawings by means of taking a digital camera as an example imaging device. The present invention is not limited to a digital camera and can also be applied to another imaging device; for instance, a video camera.

Figure 1:
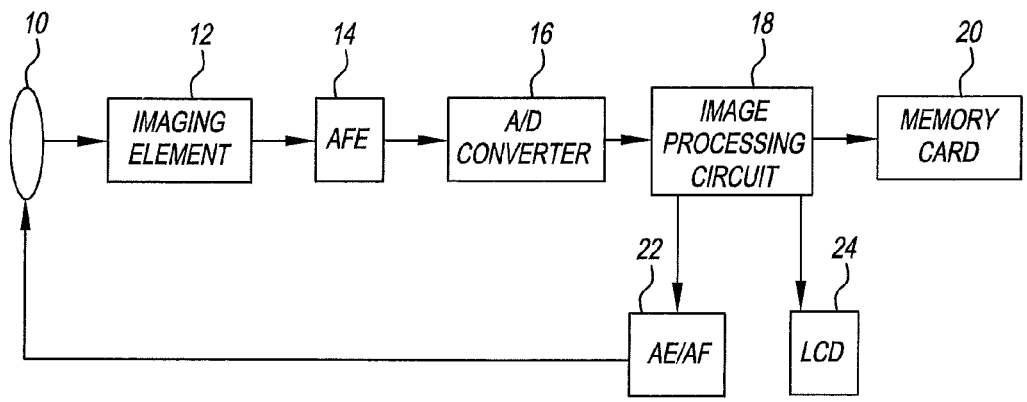
FIG. 1 is an entire block diagram of an imaging device of an embodiment.

FIG. 1 shows a configuration of a digital camera of an embodiment. A photographic optical system 10 collectively shown as a lens includes in detail an imaging lens, a diaphragm, and a mechanical shutter. The imaging lens further includes a focus lens, a zoom lens, and an iris. The respective lenses and the shutter of the photographic optical system 10 are driven by a motor or a driver in accordance with a command from an AE/AF control section 22.

An image capturing element 12 converts a subject image formed by the photographic optical system 10 into an electric signal and outputs the signals as R, G, and B image signals. The image capturing element 12 is made up of a CCD sensor and a CMOS sensor and sequentially reads accumulated electric charges in accordance with a timing signal from a timing generator (TG).

An analogue front end (AFE) 14 is an analogue signal processing section and performs correlated double sampling (CDS) processing for eliminating fixed pattern noise by means of subjecting an analogue image signal to amplification, gain adjustment, and determination of a difference between a voltage value achieved at the time of a reset and a voltage value achieved at the time of output of a signal.

An AD converter 16 converts an image signal supplied from the analogue front end (AFE) 16 into a digital signal.

The image processing circuit 18 includes a CPU and also has, as functional blocks, a known gain correction block, a gamma correction block, a synchronization block, an RGB-YC separation block, a noise reduction processing block, an edge enhancement processing block, and a JPEG compression processing block. The image processing circuit 18 subjects an input signal to gain correction, gamma correction, synchronization processing, and the like, thereby generating image data pertaining to a Y signal and image data pertaining to a C signal. Gain correction is performed by means of making a correction to gains of input RAW data (spatially-incomplete sampled data achieved before generation of an RGB image) that change from one channel to another, thereby adjusting a gray balance. Gamma correction is for matching a characteristic of an image capturing element, such as a CCD, to an input/output characteristic of an LCD. Synchronization processing is for generating three images; namely, an R image, a B image, and a G image, from a single plate CCD placed in a Bayer arrangement. Generated image data are stored in a memory card 20. Compressed image data are subjected to predetermined expansion processing, to thus generate uncompressed image data. The uncompressed image data are displayed as a photographed image on an LCD 24. The image processing circuit 18 further has a circuit for generating a preview image to be displayed on the LCD 24, a circuit for detecting a face image from a subject image, and an AWB (Automatic White Balance) circuit. An organic EL may also be used in place of the LCD 24.

An AE/AF control section 22 includes a CPU and computes required physical quantities required for AE (Automatic Exposure Control) and AF (Automatic Focusing Control). Specifically, the brightness of a subject is detected from an image signal, and a distance to the image is detected. Appropriate exposure is determined from the brightness of the subject, whereupon an "f" number, a shutter speed, and ISO sensitivity are determined.

The image processing circuit 18 is made up of a single processor; however, it may also be configured with an MPU for controlling the entire system and a DIP (Digital Image Processor) that serves as a sub-processor for the MPU and that processes image data at high speed.

Figure 2:
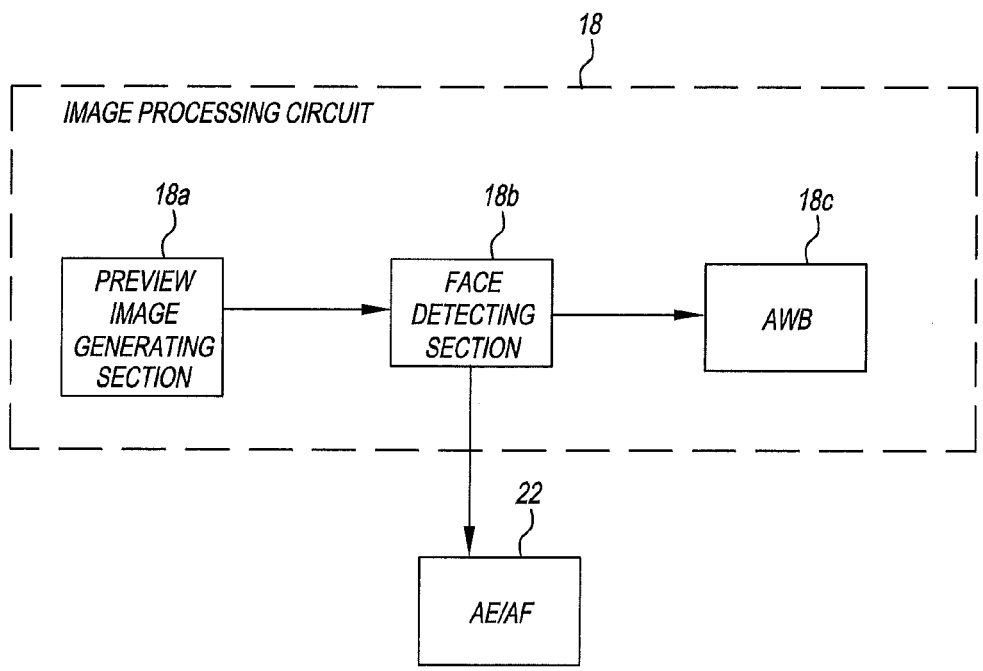
FIG. 2 is a detailed block diagram of an image processing circuit shown in FIG. 1.

FIG. 2 shows portions of the functional blocks of the image processing circuit 18. The image processing circuit 18 has a preview image generation section 18a, a face detection section 18b, and an AWB section 18c. The preview image generation section 18a generates a preview image by means of the previously-described processing operations and outputs the thus-generated image on the LCD 24. The preview image is obtained by decimating image data. The face detection section 18b detects a face image from the preview image serving as a subject image. A method for detecting a face is arbitrary; for instance, detection of eyes from a subject image; detection of characteristic elements of a face other than eyes (e.g., a nose, a mouth, hairs, and a contour of a face), detection of an oval shape of a head, and the like. The face may also be detected by combination of these methods. It may also be possible to extract a flesh-colored area from a preview image, determine the degree of matching between a face template and an image of the flesh-colored area, and detect as a face an area exhibiting a high degree of matching. Thus, although the method for detecting a face is arbitrary, the face detection section 18b of the present embodiment detects faces in specific order rather than sequentially detecting a large-size face, a medium-size face, and a small-size face and outputting results of detection as in the related art. The sequence of detection of a face will further be described later. The face detection section 18b outputs a result of detection of a face to the AWB section 18c and the AE/AF control section 22. The AWB section 18c determines the light source from the distributions of R/G and B/G in an image signal pertaining to the area of the face detected by the face detection section 18b. Gain values of R, G, and B signals are determined from the thus-determined light source. The AE/AF control section 22 detects the brightness of the area of the face detected by the face detection section 18b and a distance to the face, thereby determining appropriate exposure and an appropriate focus value.

Face AF control for performing tracking operation while a focus is set on a detected face, multi-automatic focusing control (multi-AF), and area tracking AF control for performing tracking operation while a focus is set on a subject at the screen center may also be selectively switched, to thus perform focusing control as AF control of the AE/AF control section 22. A contrast detection method, a phase detection method, or the like, may also be adopted as a distance-measuring method. The number of points whose distances are to be measured by means of multi-AF is also arbitrary for instance, three points, five points, seven points, or more.

In addition to them, the image processing circuit 18 has various types of memories, such as ROM, EEPROM, and RAM. The ROM stores control programs, including an OS to be executed by a CPU of the image processing circuit 18, and various data. Face detection processing performed by the face detection section 18b is also executed by the control program. User-programmed data are stored in the EEPROM. The RAM operates as working memory for the CPU.

Figure 3:
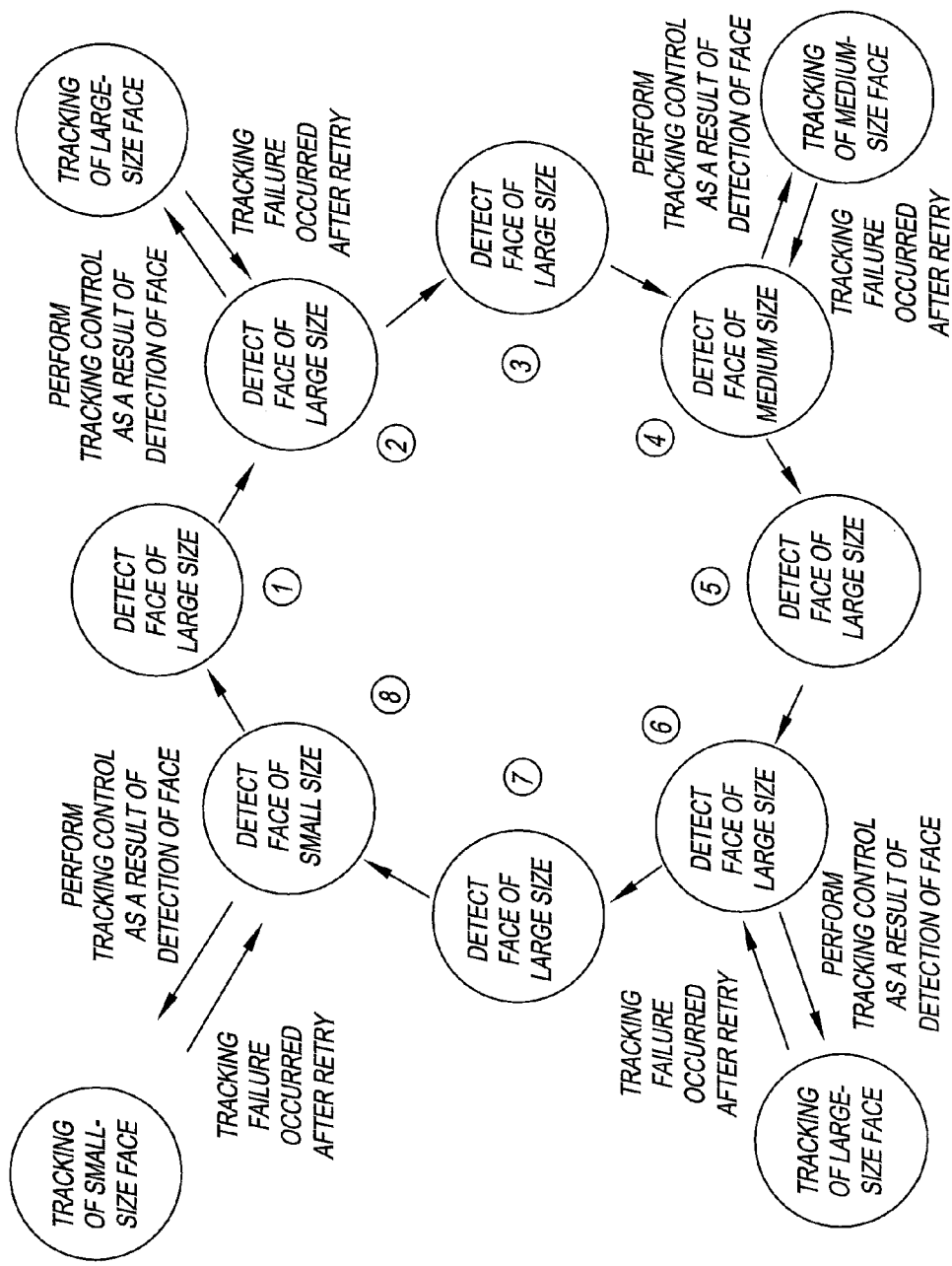
FIG. 3 is a descriptive view showing face detection processing of the embodiment.

FIG. 3 diagrammatically shows face detection processing performed by the face detection section 18b. When detecting a fact from the preview image, the face detection section 18b categorizes sizes of faces to be detected into three sizes; namely, a large size, a medium size, and a small size, and detects the faces in this sequence. As a matter of course, the large size, the medium size, and the small size are relative sizes. For instance, 60 to 240 pixels are set for a large size; 40 to 60 pixels are set for the medium size; and 30 to 40 pixels are set for the small size. Further, when a preview image has a size of; for instance, 320 pixels wide and 240 pixels high, a mask is placed on predetermined areas at both lateral ends (i.e., the preview image is subjected to masking), thereby determining an area having 240 pixels wide and 240 pixels high, which is an essential center area of the preview image, as a search target area for face detection purpose. However, limiting all face detection processing operations solely to a masked area is not desirable. The reason for this is that a human face may be present at an end of a subject image. Naturally, the entire area of a preview image may also be taken as a search target area for face detection purpose without performing masking operation. The essential requirement for masking is to merely eliminate predetermined areas on both lateral ends from a search target.

In FIG. 3, the face detection section 18b first subject both lateral ends of the preview image to masking and detects a large-size face. The detection method is as mentioned above, for instance, extracting a flesh-colored area from a subject image; determining the degree of matching between a face template and an image of the flesh-colored area; and detecting the area exhibiting a high degree of matching as a face. When a large-size face is detected, a large-size template is prepared. A result of face detection is output (a first detection step). The detection result includes; for instance the size of the detected face and a detection position. After outputting of the face detection result, the preview image is again subjected to masking, thereby detecting a large-size face and outputting a face detection result (a second detection step). Provided that a large-size face is detected in this detection step, tracking control is performed so as to track the thus-detected face. Specifically, even when the detected face moved, the thus-moved face is continually detected. Tracking control includes making a search for adjacent areas of a detected face position by means of pattern matching, computing a motion vector and tracking the face on the basis of the thus-computed motion vector, and the like. A technique for effecting AE and AF while following the track of a detected face is known. When following the track of the face is impossible, a given number of retries (e.g., five) are performed. When the retries ended in a failure, tracking control is aborted, and processing returns to a face detection algorithm. Next the preview image is again subjected to masking, thereby detecting a large-size face and outputting a face detection result (a third detection step).

After processing for detecting a large-size face has been repeated a total of three times, a mediums-size face is detected while the preview image is masked. At the time of detection of a medium-size face, a medium size template is prepared. A face detection result is output (a fourth detection step). Provided that a medium-size face is detected in this detection step, tracking control is performed so as to track the detected face. When the detected face cannot be tracked, a predetermined number of retries are performed. When the retries ended in a failure, processing returns to the face detection algorithm. Next, after the preview image has been masked, a large-size face is again detected. A face detection result is output (a fifth detection step). A large-size face is again detected while the preview image is masked. A face detection result is then output (a sixth detection step). A large-size face is detected without masking the preview image; namely, while all 320 pixels by 240 pixels are taken as a search target. A face detection result is output (a seventh detection step). The reason why masking is not performed in the seventh detection step is because a face image may be present in the areas masked in the previous detection steps; namely, a face may be present in the right and left ends. Provided that a large-size face is detected in the detection step, tracking control is performed so as to follow the track of the detected face. When the face cannot be tracked, a predetermined number of retries are performed. When the retries ended in a failure, tracking control is aborted, and processing returns to a face detection algorithm. It goes without saying that tracking is performed without involvement masking when the track of the detected face is followed. Specifically, a tracking range is the overall preview image. Finally, a small-size face is detected while the preview image is masked. A face detection result is output (an eighth detection step). When a small-size face is detected in the detection step, tracking control is performed so as to track a detected face. When the detected face cannot be tracked, a predetermined number of retries are performed. When the retries ended in a failure, processing returns to the face detection algorithm. After performance of processing pertaining to the eighth detection step, processing returns to the first detection step, where similar detection processing is iterated.

As mentioned above, the face detection section 18b performs face detection processing in sequence from the first detection step to the eighth detection step. In the first, second, and third detection steps, a large-size face is detected, and a medium-size face is detected in the fourth detection step. In the fifth, sixth, and seventh detection steps, a large-size face is again detected, and a small-size face is detected in the eighth detection step. In any of the first through sixth detection steps and the eighth detection step, a face is detected while both lateral ends of a preview image are masked. In the seventh detection step, a face is detected without masking the lateral ends of the preview image.

FIG. 4 shows face detection processing of the present embodiment. FIG. 5 shows related-art face detection processing for comparison. In the related art, faces from a large-size face to a small-size face are detected at a certain detection cycle T, and detection results are output. Faces from a large-size face to a small-size face are again detected at the next detection cycle T, and detection results are output. Consequently, provided that a large-size face shows up in a subject image during the detection cycle T after transition has been made to detection of a medium-size face without detecting a large-size face, a result of detection of a large-size face cannot be output in the detection cycle T, and a result of detection of the large-size face is acquired only at a point in time when the next detection cycle T is completed.

In the meantime, as shown in FIG. 4, in the present embodiment, processing pertaining to the first and second detection steps is performed in the detection cycle T; processing pertaining to the third and fourth detection steps is performed in the next detection cycle T; processing pertaining to the fifth and sixth detection steps is performed in the next detection cycle T; and processing pertaining to the seventh and eighth detection steps is performed in the next detection cycle T. In each of the first through third detection steps, a large-size face is detected, and a detection result is output at a point in time when processing pertaining to each of the detection steps is completed. Hence, for instance, even when a large-size face shows up in the subject image after the first detection step, a large-size face can be detected in the second or third detection step, and a detection result can be immediately output.

Figure 6:
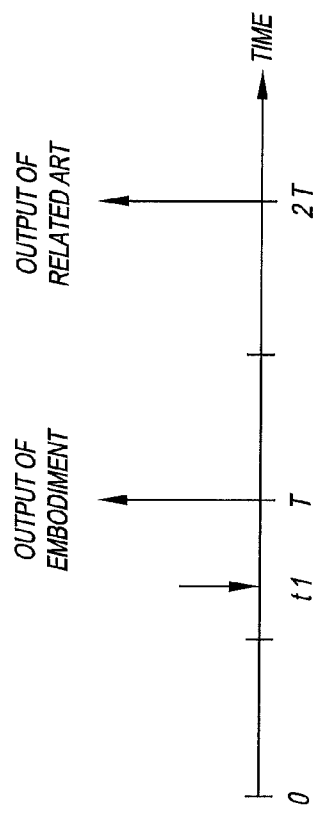
FIG. 6 is a descriptive view showing a difference between result output timings of a related-art imaging device of the embodiment.

FIG. 6 shows a timing for outputting a result of face detection of the present embodiment and a timing of the related art. A large-size face is assumed to show up at time t1 in a subject image. In the related art, a result of face detection is output after elapse of 2 T since t1. In the meantime, in the present embodiment, a result of face detection is output after elapse of ¾ T since t1.

In the present embodiment, a search range for face detection is limited to the center area of a preview image by masking the preview image in the first through sixth detection steps and the eighth detection step. A face that is present in the center area can be efficiently, immediately detected. In the seventh detection step, the entire preview image is taken as a search range without masking the preview image, and hence a face that is present at an end can be detected without fail. As mentioned previously, a time consumed at the time of detection of a large-size face becomes shorter than that involved at the time of detection of a medium-size face or a small-size face. Consequently, even when masking is not performed at the time of detection of a large-size face practiced in the seventh detection step, the processing time is not increased much. Specifically, timing at which processing is performed without performing masking operation is preferably limited to the case of detection of a large-size face. Provided that processing pertaining to the first through eighth detection steps is taken as one processing cycle, the essential requirement is to perform, in any of a plurality of steps for detecting a large-size face, processing pertaining to timing at which processing is performed without performing masking operation. It is desirable to perform processing as close as possible to a final step. Specifically, performing processing in the fifth through seventh detection steps is desirable rather than in the first through third detection steps. Performing processing in the sixth and seventh detection steps is more desirable, and performing processing in the seventh detection step is the most desirable.

Although the present embodiment has been described thus far, the present invention is not limited to the embodiment and susceptible to various modifications.

In the present embodiment, processing is performed in a manner, such as shown in FIG. 4; for instance, First detection step: Detect a large-size face
Second detection step: Detect a large-size face
Third detection step: Detect a large-size face
Fourth detection step: Detect a medium-size face
Fifth detection step: Detect a large-size face
Sixth detection step: Detect a large-size face
Seventh detection step: Detect a large-size face
Eighth detection step: Detect a small-size face.

Figure 7:
FIG. 7 is a descriptive view of face detection processing and a result output timing of another embodiment.

However, as shown in FIG. 7, processing may also be performed:

First detection step: Detect a large-size face
Second detection step: Detect a medium-size face
Third detection step: Detect a large-size face
Fourth detection step: Detect a medium-size face
Fifth detection step: Detect a large-size face
Sixth detection step: Detect a small-size face
Seventh detection step: Detect a large-size face
Eighth detection step: Detect a small-size face.

Even in this case, it goes without saying that a detection result is output in each detection step. Further, it is desirable that masking not be performed in the seventh detection step and that masking be performed in the other detection steps.

In addition, processing may also be as follows without detecting a medium-size face:

First detection step: Detect a large-size face
Second detection step: Detect a large-size face
Third detection step: Detect a large-size face
Fourth detection step: Detect a small-size face
Fifth detection step: Detect a large-size face
Sixth detection step: Detect a large-size face
Seventh detection step: Detect a large-size face
Eighth detection step: Detect a small-size face.

Alternatively, processing can also be performed without detecting a small-size face:

First detection step: Detect a large-size face
Second detection step: Detect a large-size face
Third detection step: Detect a large-size face
Fourth detection step: Detect a medium-size face
Fifth detection step: Detect a large-size face
Sixth detection step: Detect a large-size face
Seventh detection step: Detect a large-size face
Eighth detection step: Detect a medium-size face.

In any of the cases, it is desirable that masking be not performed in the seventh detection step.

Moreover, processing pertaining to the first through sixth detection steps may also be taken as one processing cycle in a more simplified manner rather than processing pertaining to the first through eighth detection steps being taken as one processing cycle.

First detection step: Detect a large-size face
Second detection step: Detect a large-size face
Third detection step: Detect a medium-size face
Fourth detection step: Detect a large-size face
Fifth detection step: Detect a large-size face
Sixth detection step: Detect a small-size face.

Alternatively, processing may also be performed as follows:

First detection step: Detect a large-size face
Second detection step: Detect a large-size face
Third detection step: Detect a small-size face
Fourth detection step: Detect a large-size face
Fifth detection step: Detect a large-size face
Sixth detection step: Detect a small-size face.

In these cases, performing processing without masking a preview image in the fifth detection step is desirable.

In the present embodiment, respective detection steps are steps for processing the entire search target range of a preview image. In the present embodiment processing for detecting a face of a certain size (a large-size face) is performed over the entire search target range, and a processing result is output each time. Even when a face cannot be detected, processing for continually detecting a face of the same size or processing for again detecting a face of the same size after skipping of one detection step can be said to be performed. In the present embodiment, a large-size face is immediately detected by means of taking the large-size face as a face having a high priority level. However, a face of a medium size, or thereabouts, or a small-size face can also be detected with priority by means of user settings. When a face of a medium size, or thereabouts, is detected with priority, there is performed; for instance, processing as provided below.

First detection step: Detect a medium-size face
Second detection step: Detect a medium-size face
Third detection step: Detect a medium-size face
Fourth detection step: Detect a large-size face
Fifth detection step: Detect a medium-size face
Sixth detection step: Detect a medium-size face
Seventh detection step: Detect a medium-size face
Eighth detection step: Detect a small-size face.

When a result of face detection is used for AE, AF, and AWB, prioritized detection of a large-size face is usually desirable.

| PARTS LIST | |
|---|---|
| 10 | optical system |
| 12 | image capturing element |
| 14 | analogue front end |

-continued

| PARTS LIST | |
|---|---|
| 16 | AD converter |
| 18 | image processing circuit |
| 18a | image generation section |
| 18b | face detection section |
| 18c | AWB section |
| 20 | memory card |
| 22 | control section |
| 24 | LCD |

What is claimed:

1. An image processing device for detecting a human face from a subject image, the device comprising:
an imaging unit that captures a subject image; and
a detection unit that detects a face from the subject image and that has at least processing for detecting a relatively-large-size face as the face, which is performed first, and processing for detecting a relatively-small-size face as the face, which is performed after the processing for detecting the relatively large face size, wherein
the detection unit first repeats, a plurality of times, processing for detecting the relatively-large-size face and outputting a detection result, before processing performs processing for detecting the relatively-small-size face and outputting a detection result; wherein the detection unit detects a face while masking predetermined areas on both lateral ends of the subject image, to thus eliminate the predetermined areas from a processing target, and a face is detected without performance of masking operation in any of the plurality of processing operations for detecting a large-size face.

2. The image processing device according to claim 1, wherein the detection unit has processing for detecting a relatively-large-size face as the face, processing for detecting a relatively-medium-size face as the face, and processing for detecting a relatively-small-size face as the face;
the detection unit first repeats a plurality of times processing for detecting a relatively-large-size face and outputting a detection result, subsequently performs processing for detecting a relatively-medium-size face and outputting a detection result, repeats a plurality of times processing for detecting a relatively-large-size face and outputting detection results, and subsequently performs processing for detecting a relatively-small-size face and outputting a detection result.

3. The image processing device according to claim 1, wherein a tracking control is performed when the relatively large size face is detected as the face during the processing for detecting the relatively large size face.

4. The image processing device according to claim 3, wherein the tracking control is performed when the relatively large size face is detected as the face during the processing for detecting relatively large size face, or when the relatively medium size face is detected as the face during the processing for detecting relatively medium size face.

5. An image processing device for detecting a human face from a subject image, comprising:
an imaging unit that captures a subject image; and
a detection unit that detects a face from the subject image and that has at least processing for detecting a relatively-large-size face as the face, processing for detecting a relatively-medium-size face as the face, and processing for detecting a relatively-small-size face as the face, wherein the detection unit first repeats three times processing for detecting a relatively-large-size face while masking predetermined areas on both lateral ends of the subject image and outputting a detection result, performs processing for detecting a relatively-medium-size face while masking the predetermined areas on both lateral ends of the subject image and outputting a detection result, repeats twice processing for detecting a relatively-large-size face while masking predetermined areas on both lateral ends of the subject image and outputting a detection result, performs processing for detecting a relatively-large-size face without performance of masking operation and outputting a detection result, and performs processing for detecting a relatively-small-size face while masking predetermined areas on both lateral ends of the subject image and outputting a detection result.

* * * * *